US010734891B2

(12) United States Patent
Oporta et al.

(10) Patent No.: US 10,734,891 B2
(45) Date of Patent: Aug. 4, 2020

(54) POWER-UP SEQUENCING AND HIGH VOLTAGE PROTECTION FOR CHARGE PUMP CONVERTERS

(71) Applicant: QUALCOMM Incorporated, San Diego, CA (US)

(72) Inventors: Hector Ivan Oporta, San Jose, CA (US); Zhaohui Zhu, San Jose, CA (US); Chunping Song, Sunnyvale, CA (US); William Rader, Carrboro, NC (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/001,073

(22) Filed: Jun. 6, 2018

(65) Prior Publication Data
US 2019/0115829 A1 Apr. 18, 2019

Related U.S. Application Data

(60) Provisional application No. 62/572,212, filed on Oct. 13, 2017.

(51) Int. Cl.
*H02M 3/07* (2006.01)
*H02M 1/36* (2007.01)
*H02J 7/00* (2006.01)
*H02J 7/02* (2016.01)

(52) U.S. Cl.
CPC ............... *H02M 3/07* (2013.01); *H02J 7/00* (2013.01); *H02J 7/022* (2013.01); *H02M 1/36* (2013.01)

(58) Field of Classification Search
CPC .. H02M 3/07; H02M 2003/071; H02M 3/073; H02J 7/022; H02J 7/0052;
(Continued)

(56) References Cited

U.S. PATENT DOCUMENTS 6,329,872 B1 * 12/2001 Foroudi ............... H03L 7/0895
327/112
7,279,961 B2 10/2007 Chan et al.
(Continued)

FOREIGN PATENT DOCUMENTS

CN 105700608 A 6/2016

OTHER PUBLICATIONS

Forouzesh M., et al., "Step-Up DC-DC Converters: A Comprehensive Review of Voltage-Boosting Techniques, Topologies, and Applications", IEEE Transactions on Power Electronics, vol. 32, No. 12, Dec. 2017, pp. 9143-9178.
(Continued)

*Primary Examiner* — Yemane Mehari
(74) *Attorney, Agent, or Firm* — Patterson & Sheridan, LLP

(57) ABSTRACT

Certain aspects of the present disclosure generally relate to methods and apparatus for powering up a charge pump converter and providing protection and soft-start circuitry therefor. One example charge pump converter generally includes a first transistor and a second transistor coupled in series between an input voltage node and an output voltage node of the charge pump converter, a first capacitive element having a first terminal coupled to a node between the first and second transistors, and a first switch coupled to the input voltage node, the first switch being configured to selectively enable a first drive circuit having an output coupled to a control terminal of the second transistor.

26 Claims, 9 Drawing Sheets

(58) Field of Classification Search
CPC ... H03L 7/08; H03L 7/089; H03L 7/18; G11C 7/12; G11C 7/22; G11C 5/145
USPC ....... 327/157, 536, 541; 330/127; 331/8, 17; 363/59
See application file for complete search history.

(56) References Cited

U.S. PATENT DOCUMENTS

| | | | |
|---|---|---|---|
| 7,430,133 | B1 | 9/2008 | McIntyre et al. |
| 7,545,658 | B2 | 6/2009 | Thiele et al. |
| 9,548,648 | B2* | 1/2017 | Amaro ................... H02M 1/08 |
| 9,590,436 | B2 | 3/2017 | Sporck et al. |
| 2013/0300385 | A1* | 11/2013 | Li ........................... H02M 3/07 |
| | | | 323/271 |
| 2016/0094124 | A1* | 3/2016 | Al-Shyoukh ........... G05F 3/242 |
| | | | 323/271 |
| 2017/0149328 | A1* | 5/2017 | Wang ..................... H02M 3/07 |

OTHER PUBLICATIONS

International Search Report and Written Opinion—PCT/US2018/049753—ISA/EPO—Feb. 28, 2019.
"5W Charge Pump Converter with bypass mode," On Semiconductor Preliminary Specification—NCP1751, Issue: 0.5, Sep. 27, 2013, 37 Pages.
NXP Semiconductors: "Monolithic Integrated High Voltage 2:1 Switched Capacitor Direct Battery Charger," PCA9468, Rev 11-13 May 2017, 36 Pages.

* cited by examiner

POWER-UP SEQUENCING AND HIGH VOLTAGE PROTECTION FOR CHARGE PUMP CONVERTERS

CLAIM OF PRIORITY UNDER 35 U.S.C. § 119

The present application claims the benefit of U.S. Provisional Patent Application Ser. No. 62/572,212, filed Oct. 13, 2017 and entitled "Power-Up Sequencing and High Voltage Protection for Charge Pump Converters," which is herein incorporated by reference in its entirety

TECHNICAL FIELD

Certain aspects of the present disclosure generally relate to electronic circuits and, more particularly, to charge pump converters.

BACKGROUND

Power management integrated circuits (power management ICs or PMICs) are used for managing the power requirement of a host system. A PMIC may be used in battery-operated devices, such as mobile phones, tablets, laptops, wearables, etc., to control the flow and direction of electrical power in the devices. The PMIC may perform a variety of functions for the device such as DC-to-DC conversion, battery charging, power-source selection, voltage scaling, power sequencing, etc. In some cases, the PMIC may include one or more charge pump converters, which may also be referred to as switched-capacitor converters.

SUMMARY

Certain aspects of the present disclosure generally relate to techniques and apparatus for powering up a charge pump converter.

Certain aspects of the present disclosure provide a charge pump converter. The charge pump converter generally includes a first transistor and a second transistor coupled in series between an input voltage node and an output voltage node, a first capacitive element having a first terminal coupled to a node between the first and second transistors, and a first switch coupled to the input voltage node, the first switch being configured to selectively enable a first drive circuit having an output coupled to a control terminal of the second transistor.

Certain aspects of the present disclosure provide a charge pump converter. The charge pump converter generally includes an input voltage node, an output voltage node, a voltage divider coupled to the input voltage node, a comparator having a first input coupled to a tap of the voltage divider and a second input coupled to the output voltage node, and a selectively enabled current source coupled between the input voltage node and the output voltage node.

Certain aspects of the present disclosure provide a method of powering up a charge pump converter. The method generally includes closing a first switch to enable a first drive circuit, a first transistor and a second transistor being coupled in series between an input voltage node and an output voltage node of the charge pump converter, and the first drive circuit having an output coupled to a control terminal of the second transistor.

Certain aspects of the present disclosure provide a method of powering up a charge pump converter. The method generally includes enabling a first current source coupled between an input voltage node and an output voltage node of the charge pump converter; after enabling the first current source, comparing a voltage associated with the output voltage node with a first reference voltage; and after the voltage associated with the output voltage node at least one of meets or exceeds the first reference voltage based on the comparison, outputting an indication for the charge pump converter.

Certain aspects of the present disclosure provide an apparatus for powering up a charge pump converter. The charge pump converter has a first transistor and a second transistor coupled in series between an input voltage node and an output voltage node of the charge pump converter. The apparatus generally includes means for driving a control terminal of the second transistor and means for selectively enabling the means for driving.

Certain aspects of the present disclosure provide an apparatus for powering up a charge pump converter. The apparatus generally includes means for enabling a first current source coupled between an input voltage node and an output voltage node of the charge pump converter; means for comparing a voltage associated with the output voltage node with a first reference voltage; and means for outputting an indication for the charge pump converter after the voltage associated with the output voltage node at least one of meets or exceeds the first reference voltage based on the comparison.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

Figure 1:
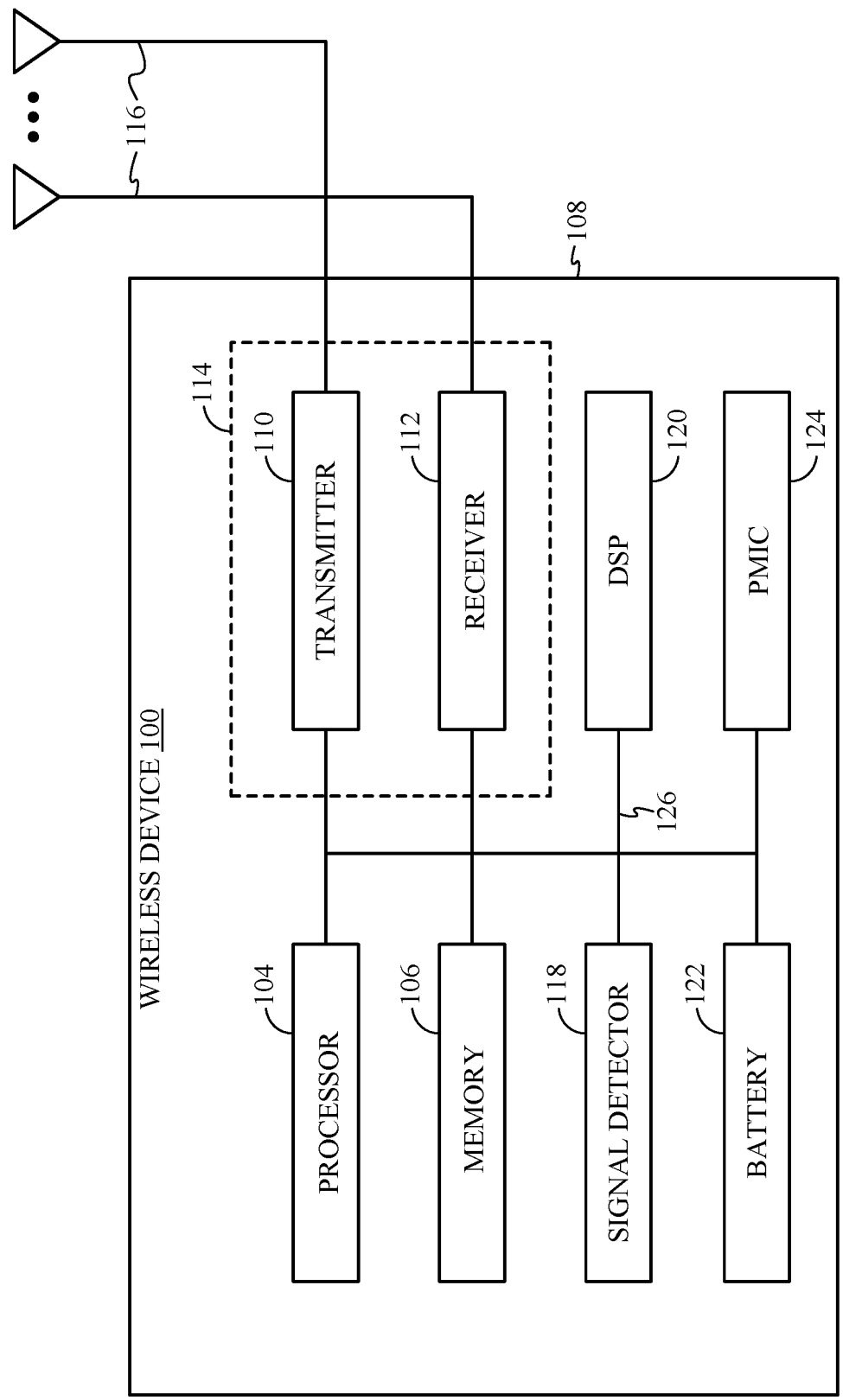
FIG. 1 illustrates a block diagram of an example device that includes a battery charging circuit, according to certain aspects of the present disclosure.

FIG. 1 illustrates an example device 100 in which aspects of the present disclosure may be implemented. The device 100 may be a battery-operated device such as a cellular phone, a personal digital assistant (PDA), a handheld device, a wireless device, a laptop computer, a tablet, a smartphone, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. The device 100 may also include a power management integrated circuit (power management IC or PMIC) 124 for managing the power from the battery to the various components of the device 100. The PMIC 124 may perform a variety of functions for the device such as DC-to-DC conversion, battery charging, power-source selection, voltage scaling, power sequencing, etc. In certain aspects, the PMIC 124 may include a battery charging circuit (e.g., a master-slave battery charging circuit), as described below. The various components of the device 100 may be coupled together by a bus system 126, which may include a power bus, a control signal bus, and/or a status signal bus in addition to a data bus.

Example Power-Up Sequencing and Protection Circuitry for Charge Pump Converters A charge pump converter, also referred to as a switched-capacitor converter, is a type of inductorless DC/DC converter that uses one or more capacitors as the energy storage element(s), rather than an inductor (as in the case of switched-mode power supplies). Inductors can be relatively expensive, occupy a relatively large amount of area, and are likely to emit radio frequency (RF) energy. Charge pump converters operate by transferring the charge from a flying capacitor to an output capacitor by using sets of switches that are activated/deactivated periodically to charge and discharge the flying capacitor.

A charge pump converter may be used as a standalone converter or may be used in conjunction with another converter, which may be referred to as a companion converter. For example, in order to charge the battery (e.g., battery 122) in a portable device, a battery charging circuit may be utilized. For certain aspects, the battery charging circuit may reside in a PMIC (e.g., PMIC 124). The battery charging circuit may comprise, for example, one or more charge pump converters and/or one or more switched-mode power supplies (e.g., a buck converter). The battery charging circuit may comprise two or more parallel charging circuits, each capable of charging the battery, which may be connected together and to the battery in an effort to provide fast charging of the battery. Example parallel battery charging circuits are described in U.S. Pat. No. 9,590,436 to Sporck et al., filed Apr. 11, 2014 and entitled "Master-Slave Multi-Phase Charging." Conventional charging circuits, like those described in U.S. Pat. No. 9,590,436, for a parallel charger may use buck converter topologies. However, one of the buck converters may be replaced with a charge pump converter in some parallel charging circuits.

High load current and high efficiency charge pump converters may be implemented with relatively large switching field-effect transistors (FETs) and, thus, relatively large gate drivers. In an effort to minimize die area (also referred to as "real estate"), it is often desirable to use complementary metal-oxide semiconductor (CMOS) for the gate drivers. However, when using CMOS rated for a particular voltage (e.g., 5 volts (V)) to implement the driver design, certain challenges may arise when operating with a high voltage input (e.g., VIN>10 V). One challenge involves safely powering up the charge converter when a high voltage input is present. Another challenge entails protecting circuits during a high voltage surge on the input (e.g., to pass the 28 V IEC 61000-4-5 Surge Immunity Test).

Furthermore, due to a high load current demand (e.g., >5 A), the output capacitor ($C_{out}$) and the flying capacitor ($C_f$) in the charge pump converter may be implemented with relatively large capacitances. Therefore, minimizing, or at least reducing, inrush current during power up becomes a challenge.

Certain aspects of the present disclosure provide a power-up sequence and supporting circuitry for high voltage input charge pump converters. Such aspects may allow CMOS devices to be used for all gate drivers in a charge pump converter. During the power-up sequence, large capacitors may be precharged to eliminate inrush current without the use of a large power FET in the front-end or an additional internal charge pump to turn on the gates of the power switches. Also, the supporting circuitry may serve as protection circuitry during an overvoltage event on the input (e.g., according to the 28 V IEC 61000-4-5 Surge Immunity Test).

FIGS. 2A-2F illustrate an example circuit diagram of a charge pump converter 200 with drivers 202 and protection and soft-start circuitry, in accordance with certain aspects of the present disclosure. FIGS. 2A-2F also illustrate an example power-up sequence for the charge pump converter 200.

Figure 2A:
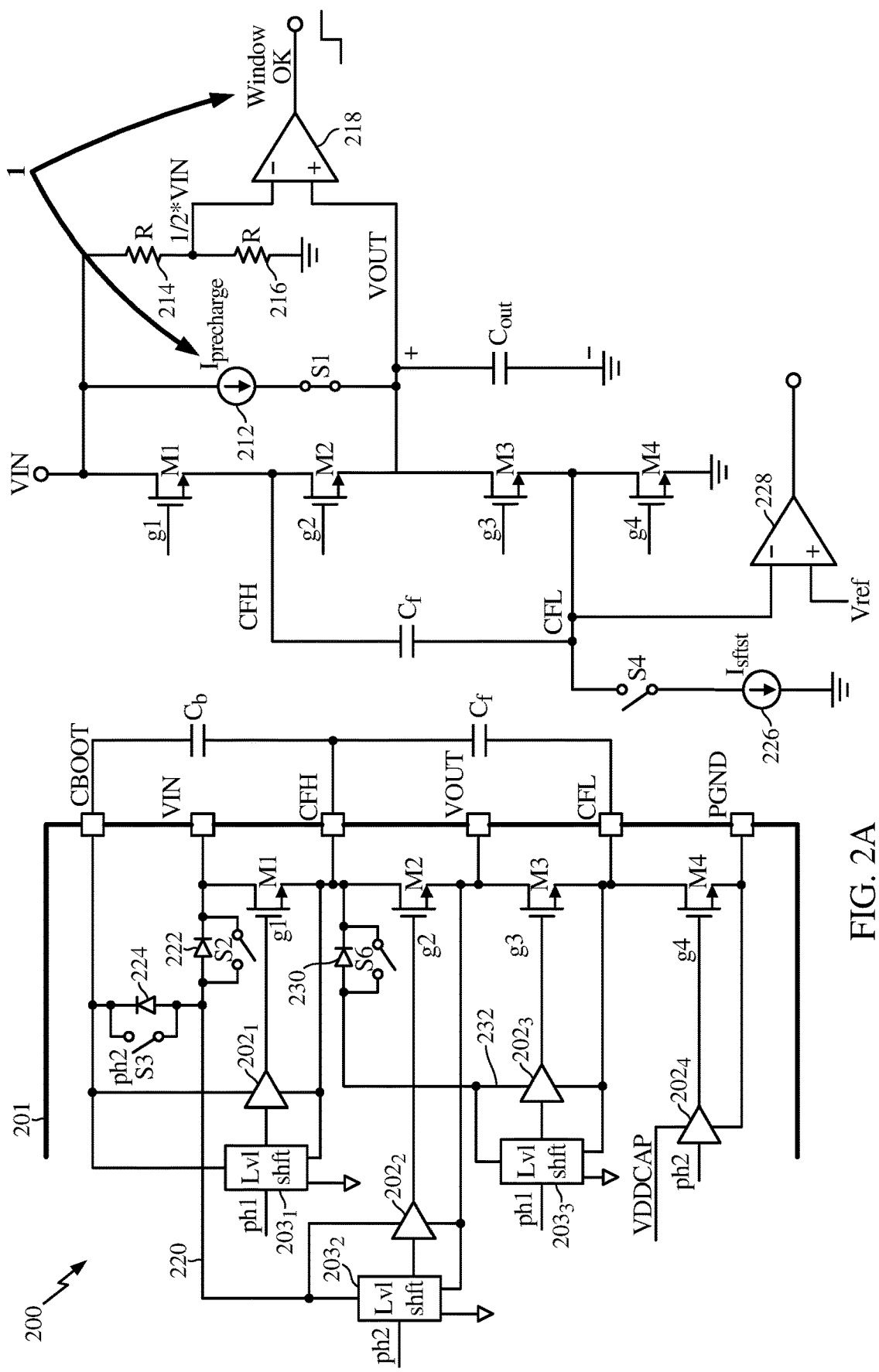
FIGS. 2A-2F include an example circuit diagram of drivers for a charge pump converter with protection circuitry and soft-start circuitry, illustrating a power-up sequence for the charge pump converter, in accordance with certain aspects of the present disclosure.

The charge pump converter 200 may be at least partially implemented in an integrated circuit (IC) (e.g., IC 201). For certain aspects, the flying capacitor ($C_f$) and/or the output capacitor ($C_{out}$) in the charge pump converter 200 may be implemented external to the IC 201, as illustrated in FIG. 2A. The IC 201 may include connections for interfacing with components external to the IC. For example, the IC 201 may include connections for a boot capacitor node (labeled "CBOOT"), an input voltage node (labeled "VIN"), a high flying capacitor node (labeled "CFH"), an output voltage node (labeled "VOUT"), a low flying capacitor node (labeled "CFL"), and a power ground node (labeled "PGND"). A boot capacitor ($C_b$) may be connected between the CBOOT node and the CFH node, internal or external to the IC 201. $C_f$ may be connected between the CFH node and the CFL node, and $C_{out}$ may be coupled between the VOUT node and electrical ground for the charge pump converter 200 (e.g., the PGND node).

The charge pump converter 200 may include a number of transistors, such as n-type metal-oxide semiconductor (NMOS) field-effect transistors (FETs) M1-M4. The drain and source of FET M1 may be connected between the VIN node and the CFH node. The drain and source of FET M2 may be connected between the CFH node and the VOUT node. The drain and source of FET M3 may be connected between the VOUT node and the CFL node. The drain and source of FET M4 may be connected between the CFL node and the PGND node. The gates of M1-M4 are coupled to the outputs of gate drivers $202_1$-$202_4$ (collectively "gate drivers 202") for producing gate signals g1-g4, respectively. The inputs of gate drivers $202_1$-$202_3$ may be connected with the outputs of level shifters $203_1$-$203_3$.

The protection and soft-start circuitry for the charge pump converter 200 may include switches S1, S2, S3, S4, and S6; current sources 212 and 226; resistors 214 and 216; comparators 218 and 228; and diode devices 222, 224, and 230. For example, the switches S1, S2, S3, S4, and S6 may be implemented using transistors (e.g., FETs), and the diode devices 222, 224, and 230 may be implemented using diodes or diode-connected transistors. At least a portion of the protection and soft-start circuitry may be implemented internal to the IC 201. Switch S1 and current source 212 may be connected in series between the VIN node and the VOUT node. Switch S2 may be connected in parallel with diode device 222 between the VIN node and a power supply node 220 for the g2 gate driver $202_2$ (and the g2 level shifter $203_2$). Switch S3 may be connected in parallel with diode device 224 between the CBOOT node and the VIN node. Switch S4 and current source 226 may be connected in series between the CFL node and electrical ground for the charge pump converter 200 (e.g., the PGND node). Switch S6 may be connected in parallel with diode device 230 between the CFH node and a power supply node 232 for the g3 gate driver $202_3$ (and the g3 level shifter $203_3$).

Although switches S1 and S4 are illustrated as being in series with current sources 212 and 226, the reader is to understand that switches S1 and S4 may be conceptual representations for certain aspects, representing the enablement (switch closed) and disablement (switch open) of the respective current sources in actual implementations. Similarly, the parallel switch and diode device combinations (e.g., switch S2 with diode device 222, switch S3 with diode device 224, and switch S6 with diode device 230) may be a conceptual representation for certain aspects, which may be actually implemented by a transistor (e.g., a FET) that is turned on (switch closed) or turned off (switch open). The body diode of the transistor in the actual implementation may be oriented as illustrated by the diode device in FIGS. 2A-2F. For ease of understanding the concepts, the protection circuitry is illustrated and described herein with switches in series with the current sources and switches in parallel with the diode devices.

Comparator 218 may have a negative input coupled to a tap of a voltage divider connected between the VIN node and electrical ground. The voltage divider includes resistor 214 (connected between the VIN node and the tap) and resistor 216 (connected between the tap and ground). The positive input of comparator 218 may be coupled to the VOUT node. Comparator 228 may have a negative input coupled to the CFL node and a positive input coupled to a voltage reference node having a reference voltage (Vref).

Starting with Step 1 of the power-up sequence as illustrated in FIG. 2A, the output capacitor ($C_{out}$) may be charged using a precharge current ($I_{precharge}$) by closing switch S1 in series with the $I_{precharge}$ current source 212 (or by enabling the current source 212). As $C_{out}$ is charged, the output voltage (VOUT) across $C_{out}$ may eventually be equal to one half of the input voltage (VIN) (i.e., VOUT=(½)*VIN) according to the resistance ratio in the voltage divider (i.e., when both resistors 214, 216 have equal resistance R as shown). Once VOUT equals or exceeds the reference voltage (e.g., VIN/2) at the other input to the window comparator 218, the window comparator may output a logic high "Window Ok" signal, which may indicate that the circuitry involved in the power-up sequence is ready to proceed to the next step.

Figure 2B:
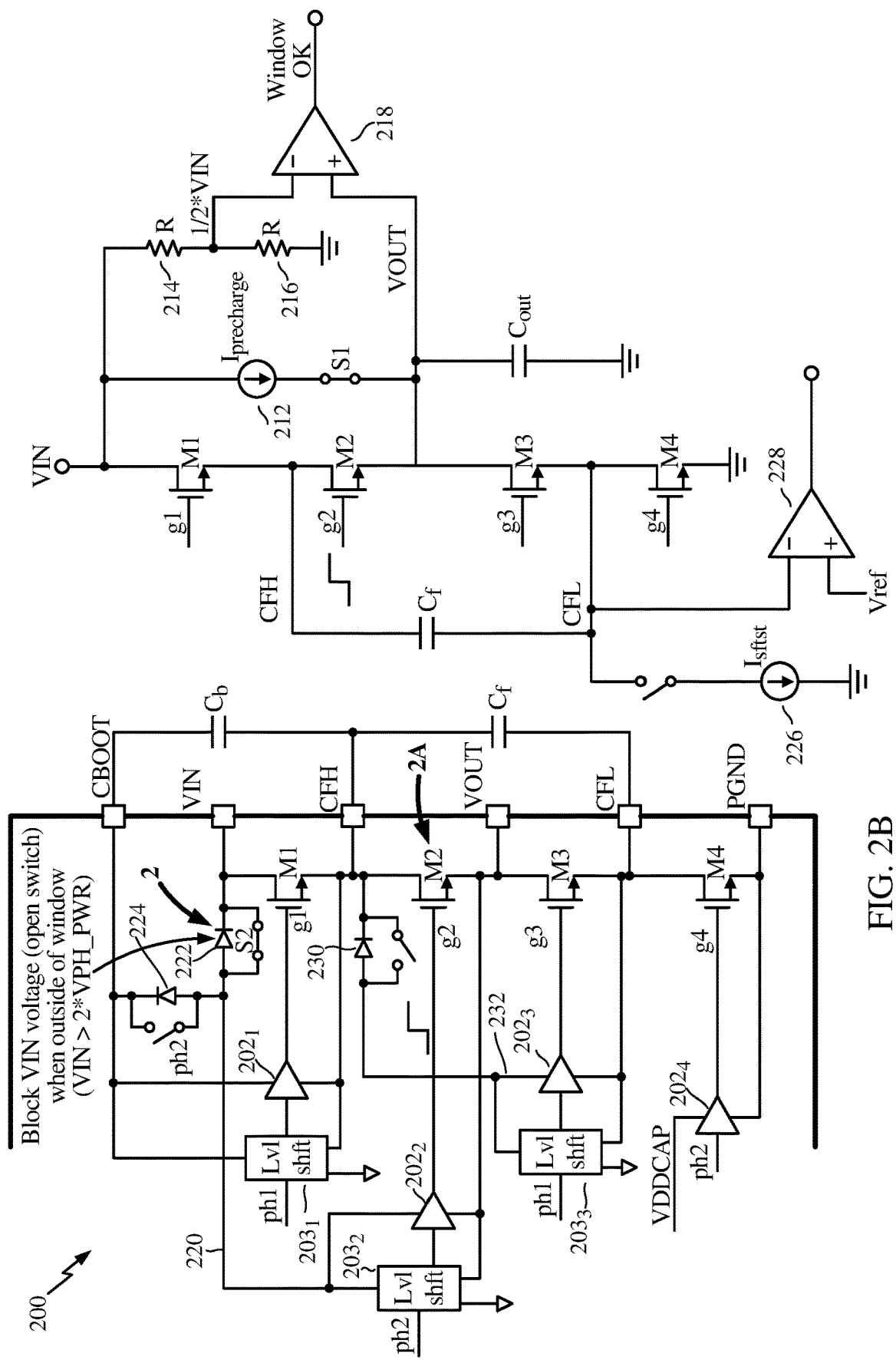

At Step 2, as illustrated in FIG. 2B, switch S2 may be closed, which will short the diode device 222, which is connected between the VIN node and the power supply node 220 for the g2 gate driver $202_2$. By closing switch S2 (or by turning on a transistor (not shown) implementing switch S2 and the diode device 222), the VIN node is shorted to the power supply node 220, thereby providing power to the g2 gate driver $202_2$. At Step 2A, FET M2 may be turned on when gate signal g2 (output by the g2 gate driver $202_2$) goes logic high, thereby effectively shorting the CFH node to the VOUT node.

Figure 2C:
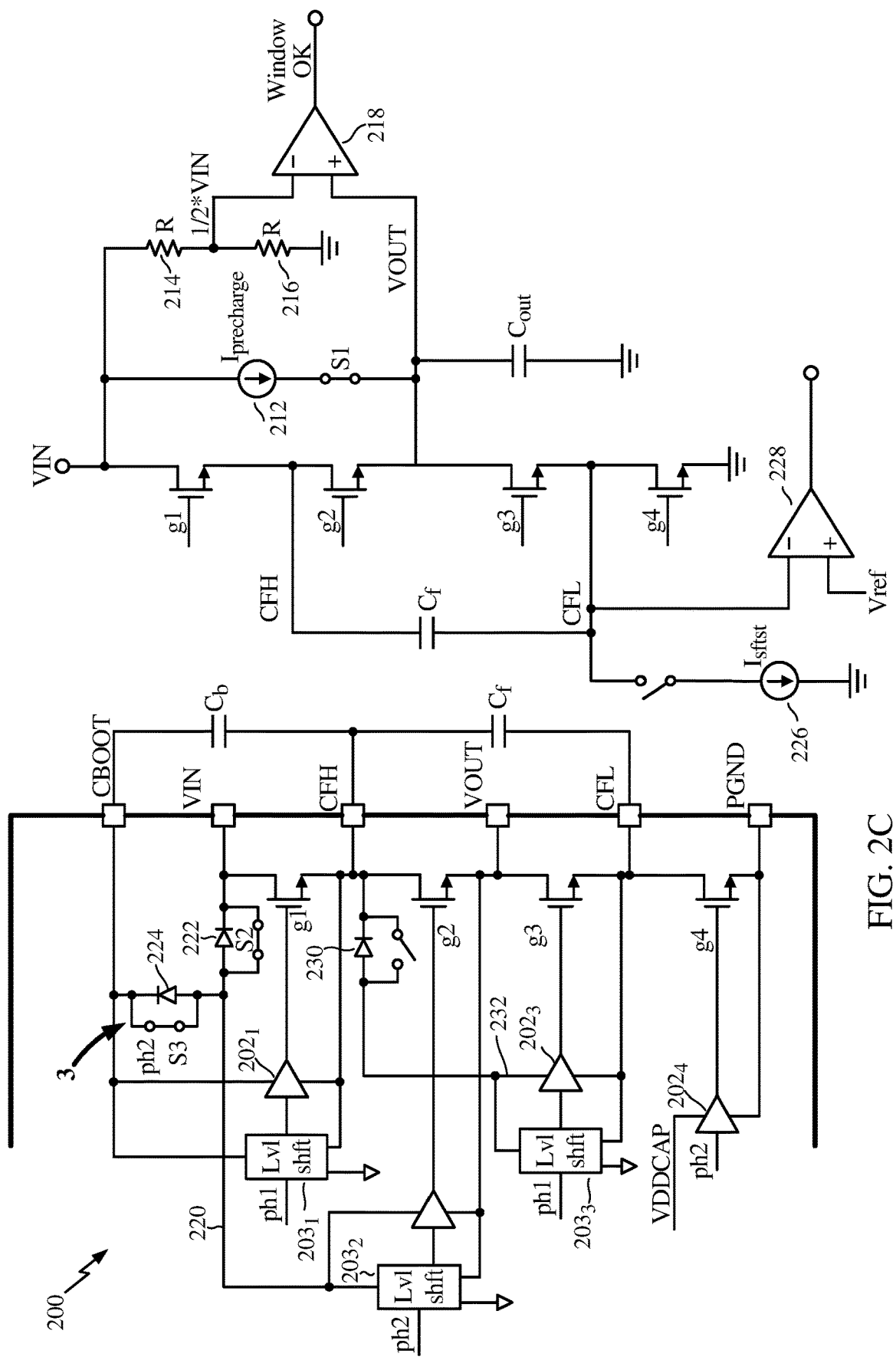

At Step 3, as illustrated in FIG. 2C, the CBOOT switch (switch S3) may be closed, which will short the diode device 224. By closing the CBOOT switch (or by turning on a transistor (not shown) implementing switch S3 and the diode device 224), the VIN node is shorted to the CBOOT node, thereby charging the boot capacitor ($C_b$) connected between the CBOOT node and the CFH node.

Figure 2D:
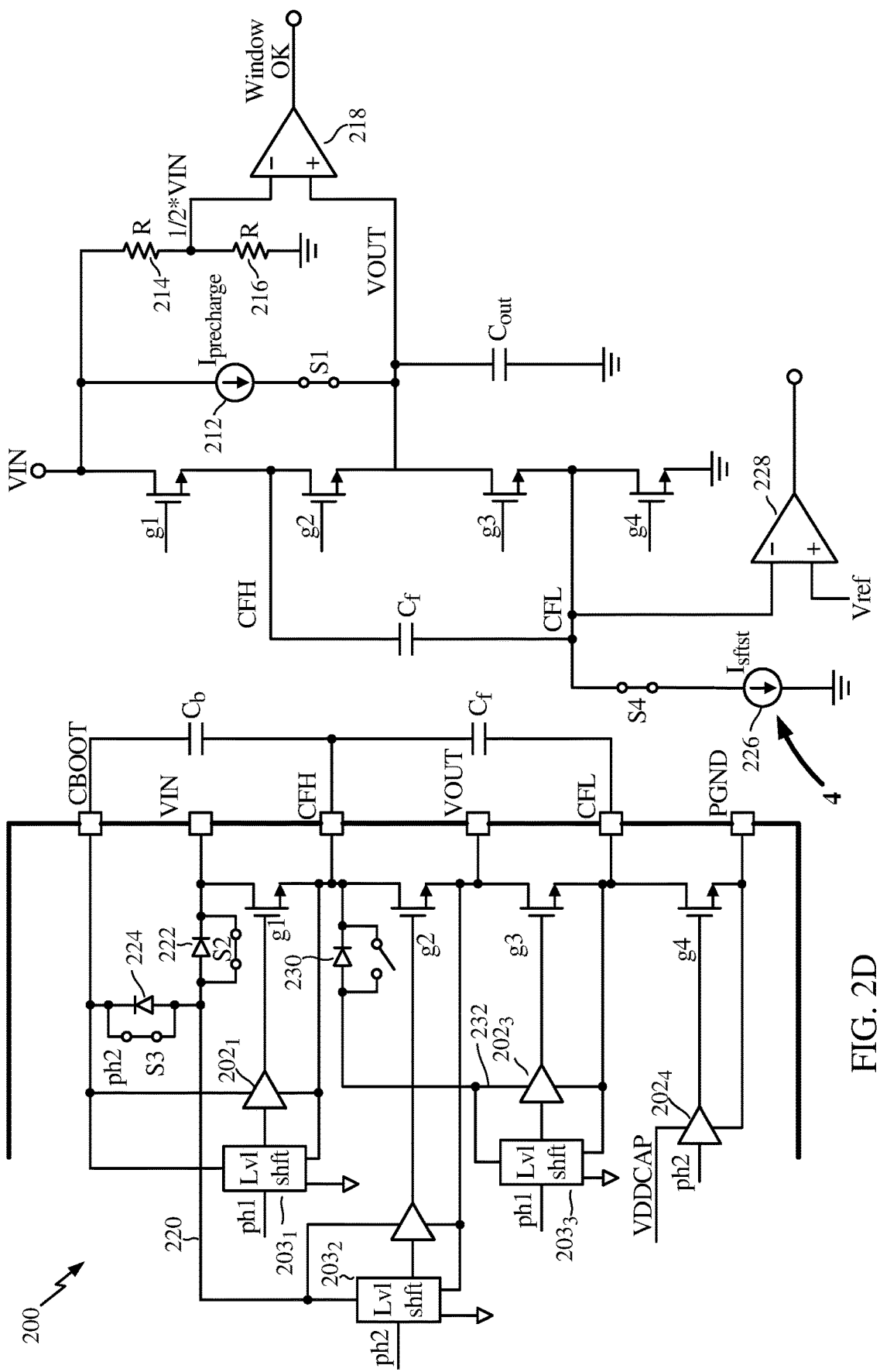

At Step 4, as illustrated in FIG. 2D, the flying capacitor ($C_f$) may be soft-started by closing the soft-start switch (switch S4) connected in series with the $I_{sfst}$ current source 226 (or by enabling the current source 226), thereby pulling down the voltage on the CFL node. During this time, $I_{precharge}$ may be kept enabled (e.g., by keeping switch S1 closed).

Figure 2E:
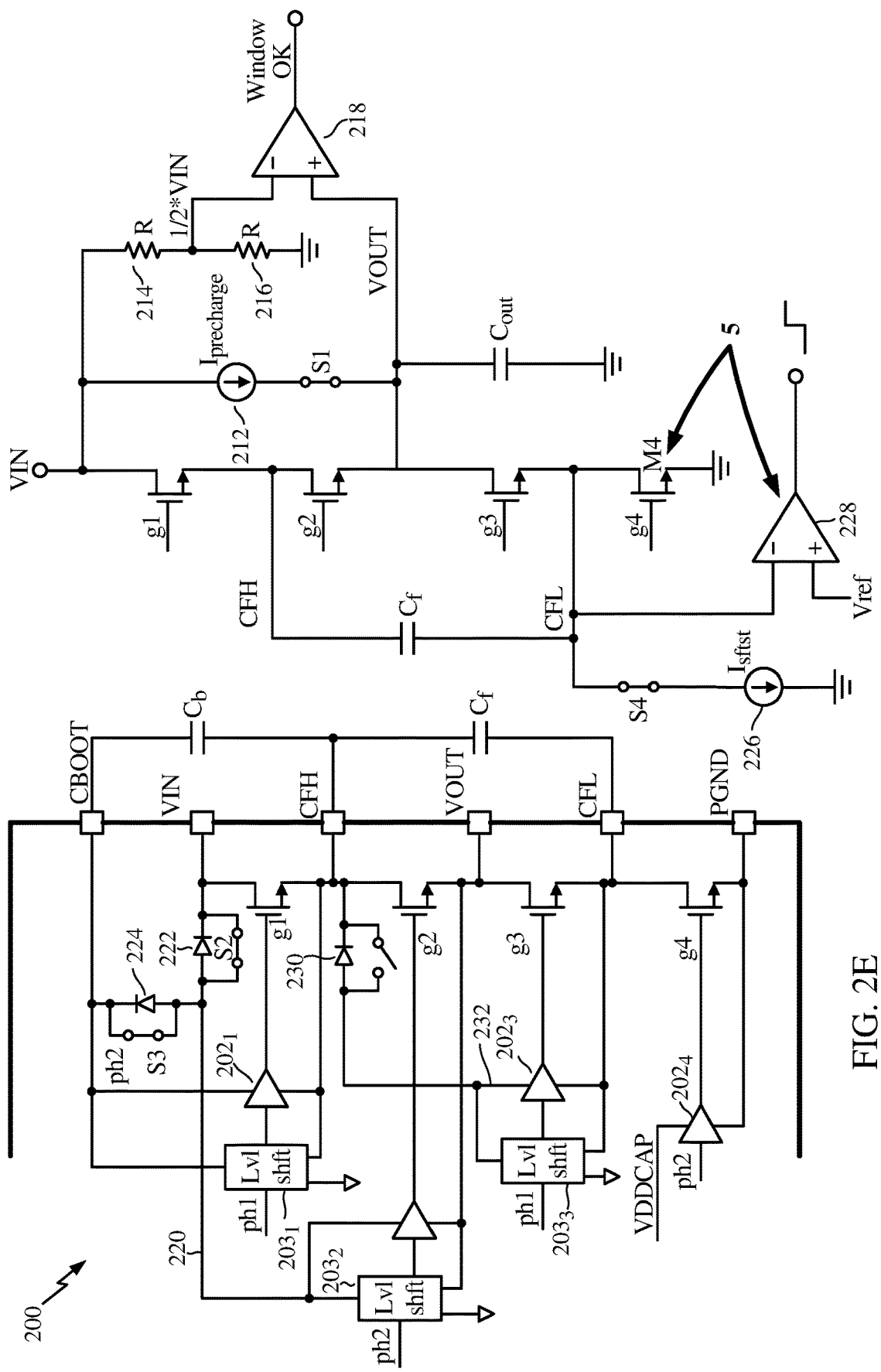
Figure 2F:
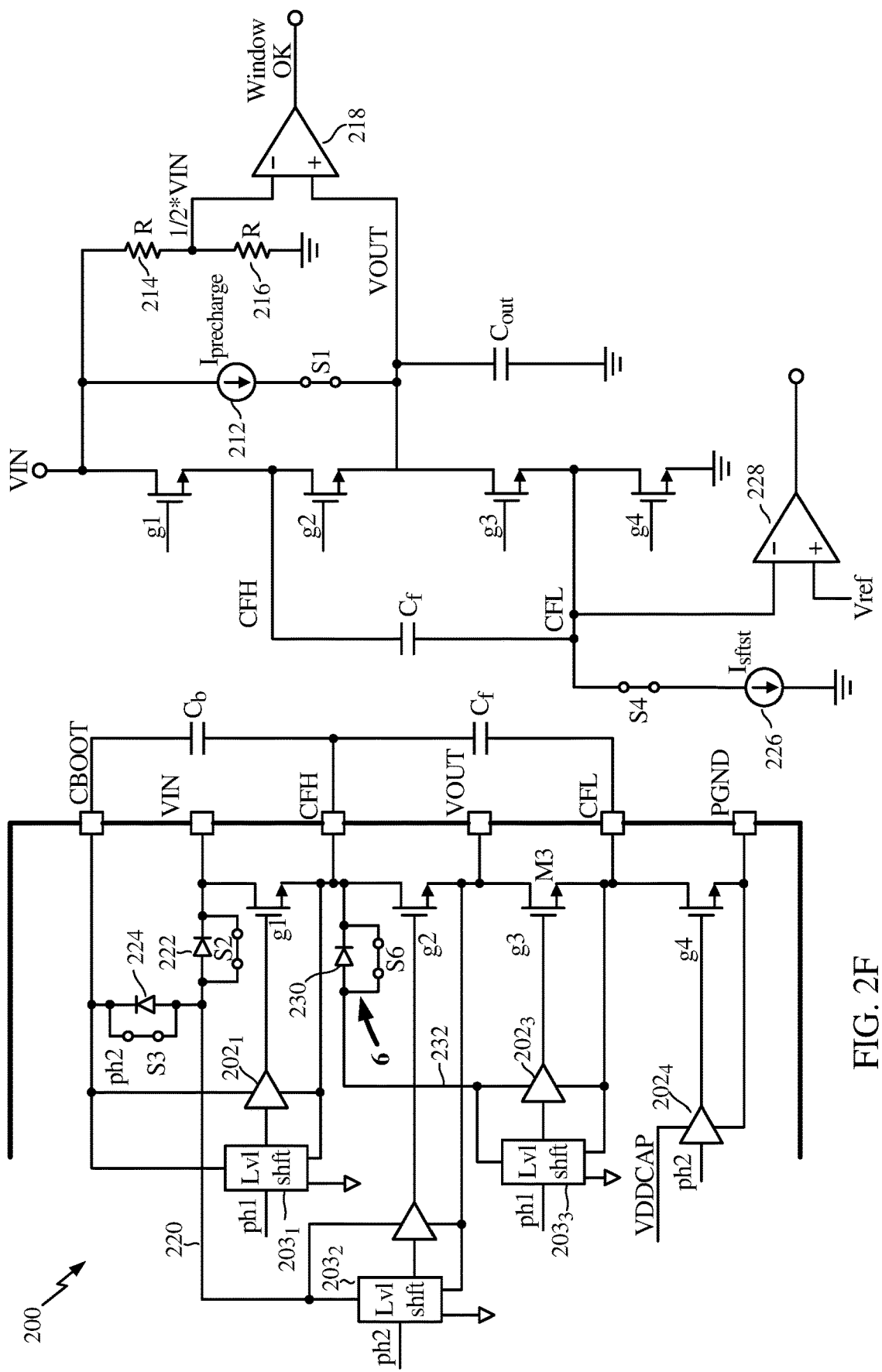

When the voltage on the CFL node reaches a reference voltage (Vref) (e.g., 50 mV with respect to electrical ground) at Step 5 (as illustrated in FIG. 2E), the comparator 228 may output a control signal (e.g., transitioning from logic low to logic high), which may trigger the g4 gate driver $202_4$ to output a logic high gate signal g4 to turn on FET M4 for one clock cycle (e.g., 5 µs with a 200 kHz clock cycle). Turning on FET M4 effectively connects the CFL node to the PGND node to finish the $C_f$ soft start.

At Step 6, switch S6 may be closed, which will short the diode device 230 connected between the CFH node and a power supply node 232 for the g3 gate driver $202_3$. By shorting the diode device 230 (or by turning on a transistor (not shown) implementing switch S6 and the diode device 230), the CFH node provides power to the g3 gate driver $202_3$.

At Step 7, a "soft start done" status signal (e.g., ss_done) may be issued, thereby indicating completion of the power-up sequence. With the end of the power-up sequence, phase one (ph1) and phase two (ph2) non-overlapping clocks may be allowed to pass through, thereby beginning normal operation for the charge pump converter 200 at Step 8.

This power-up sequence and supporting circuitry as described above provide several benefits. First, the front-end need not include a large power FET for power up, which may occupy a relative large die area (~1 mm²). Moreover, the circuit need not include an additional, internal charge pump for power up. Furthermore, the robust driver design presented in FIG. 2 may be implemented with CMOS devices (e.g., 5 V CMOS devices). This is because the VOUT pre-bias current, window comparator 218, and blocking switches S2, S3, and S6 allow CMOS devices to be used safely for all four of the gate drivers 202. In addition, the use of blocking switches and the window comparator protect the gate drivers in the scenario where an overvoltage condition occurs on the VIN node. In this scenario, FET M1 and switches S2 and S3 may be used to protect the circuit from high voltage at the VIN node. Also, the use of blocking switches S2 and S6 may simplify the electrostatic discharge (ESD) protection design for the power pins. The driver circuits may not be a parallel path and need not be considered during the ESD design.

Furthermore, the power-up sequence and supporting circuitry may provide various inrush current improvements. For example, certain aspects of the present disclosure may ensure that the output capacitor ($C_{out}$) and the flying capacitor ($C_f$) are fully charged before enabling the charge pump converter 200. Not only may this eliminate the inrush current, but the $C_f$ charging current may not conduct through the body diodes of the power FETs. Rather, body diode conduction is limited to the discharge of parasitic inductance (L) in metal traces of the circuit. As another benefit, the same power-up sequence and protection/soft-start circuitry may be used when charging a battery by disabling the Vout pre-bias current.

Figure 3:
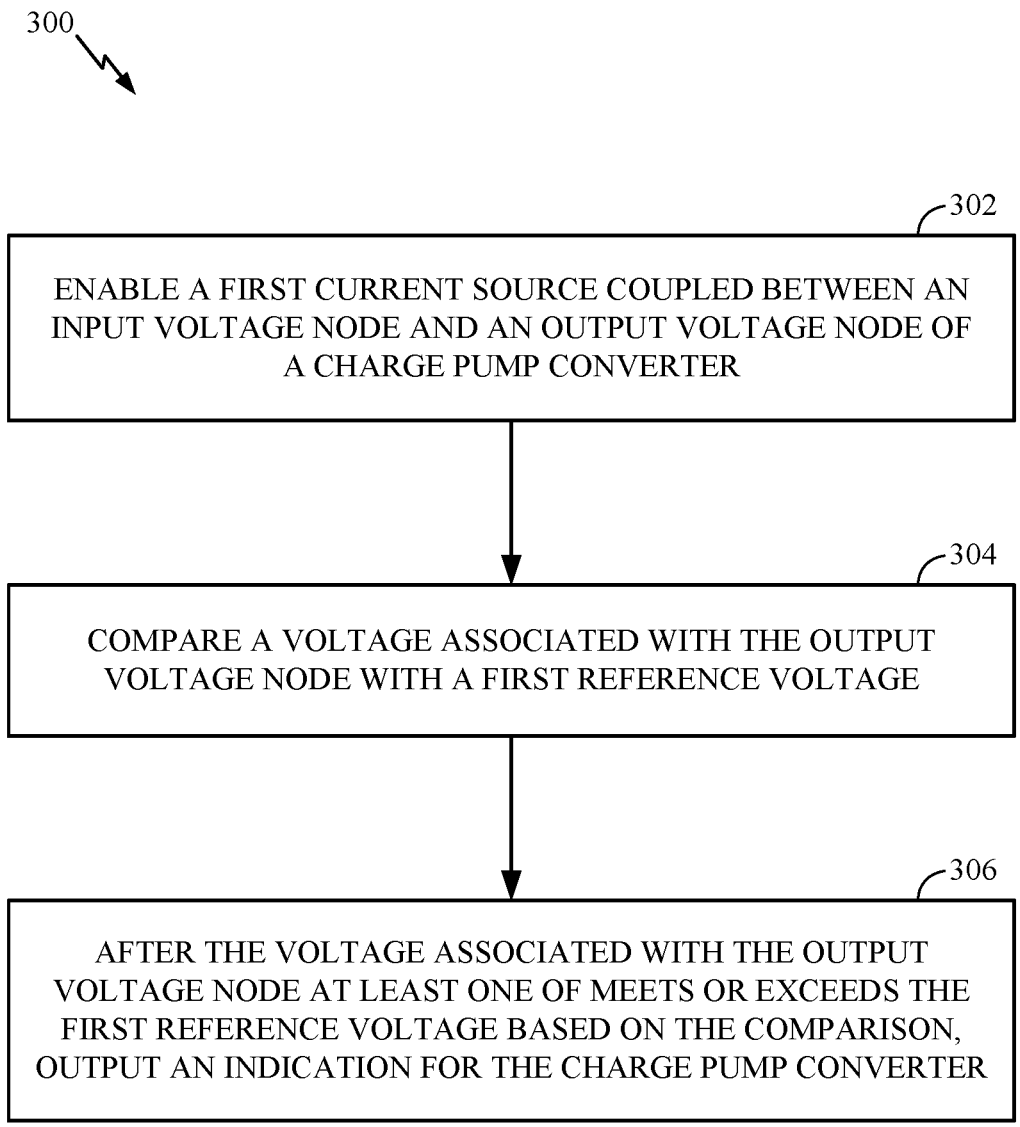
FIGS. 3 and 4 are flow diagrams of example operations for powering up a charge pump converter, in accordance with certain aspects of the present disclosure.

FIG. 3 is a flow diagram of example operations 300 for powering up a charge pump converter, in accordance with certain aspects of the present disclosure. The operations 300 may be performed by a charge pump converter, such as the charge pump converter 200 of FIGS. 2A-2F, and more specifically with the assistance of the protection and soft-start circuitry of the charge pump converter.

The operations 300 may begin, at block 302 by enabling a first current source (e.g., current source 212) coupled between an input voltage node (e.g., the VIN node) and an output voltage node (e.g., the VOUT node) of the charge pump converter. After enabling the first current source at block 302, a voltage (Vout) associated with the output voltage node is compared (e.g., by comparator 218) with a first reference voltage at block 304. At block 306, after the voltage associated with the output voltage node at least one of meets or exceeds the first reference voltage based on the comparison, an indication (e.g., a Window Ok signal) for the charge pump converter is output.

According to certain aspects, enabling the first current source charges a capacitive element (e.g., $C_{out}$) coupled between the output voltage node and a reference potential node for the charge converter.

According to certain aspects, enabling the first current source entails closing a first switch (e.g., switch S1) coupled in series with the first current source between the input voltage node and the output voltage node.

According to certain aspects, the operations 300 further involve generating the first reference voltage with a voltage divider. The voltage divider may include a first resistive element (e.g., resistor 214) coupled between the input voltage node and a tap of the voltage divider and a second resistive element (e.g., resistor 216) coupled between the tap of the voltage divider and a reference potential node (e.g., electrical ground) for the charge pump converter. For certain aspects, the first and second resistive elements have the same resistance.

According to certain aspects, the operations 300 further entail closing a first switch (e.g., switch S2) coupled in parallel with a first diode device (e.g., diode device 222). A first transistor (e.g., FET M1) and a second transistor (e.g., FET M2) may be coupled in series between the input voltage node and the output voltage node. For certain aspects, a first drive circuit (e.g., g2 gate driver $202_2$) has an output coupled to a control terminal (e.g., gate) of the second transistor. For certain aspects, the first diode device has a cathode coupled to the input voltage node and an anode coupled to a first power supply node (e.g., power supply node 220) of the first drive circuit. For certain aspects, a second power supply node of the first drive circuit is coupled to the output voltage node.

According to certain aspects, the operations 300 further include outputting a gate drive signal (e.g., g2) from the first drive circuit to turn on the second transistor. In this case, a source of the second transistor may be coupled to the output voltage node and a drain of the second transistor may be coupled to a capacitive element (e.g., $C_f$).

According to certain aspects, the operations 300 further involve closing a second switch (e.g., switch S3) coupled in parallel with a second diode device (e.g., diode device 224). For certain aspects, a second drive circuit (e.g., driver $202_1$) has an output coupled to a control terminal (e.g., a gate) of the first transistor. For certain aspects, the second diode device has a cathode coupled to a first power supply node (e.g., the CBOOT node) of the second drive circuit and an anode coupled to at least one of the first power supply node of the first drive circuit or the anode of the first diode device. For certain aspects, a first capacitive element (e.g., boot capacitor ($C_b$)) has a first terminal coupled to a node (e.g., the CFH node) between the first and second transistors and a second terminal coupled to at least one of the cathode of the second diode device or the first power supply node of the second drive circuit.

According to certain aspects, the operations 300 further entail enabling a second current source (e.g., current source 226) coupled between a first terminal of a second capacitive element (e.g., $C_f$) and a reference potential node (e.g., electrical ground) for the charge pump converter. For certain aspects, a second terminal of the second capacitive element is coupled to the node between the first and second transistors. For certain aspects, a third transistor (e.g., FET M3) and a fourth transistor (e.g., FET M4) are coupled in series between the output voltage node and the reference potential node for the charge pump converter. For certain aspects, the first terminal of the second capacitive element is coupled to a node (e.g., the CFL node) between the third and fourth transistors. For certain aspects, a third drive circuit (e.g., g3 gate driver 202$_3$) has an output coupled to a control terminal (e.g., a gate) of the third transistor.

According to certain aspects, enabling the second current source involves closing a third switch (e.g., switch S4) coupled in series with the second current source between the first terminal of the second capacitive element and the reference potential node.

According to certain aspects, the operations 300 further include, after enabling the second current source, comparing a voltage associated with the first terminal of the second capacitive element with a second reference voltage (e.g., Vref). After the voltage associated with the first terminal of the second capacitive element at least one of meets or exceeds the second reference voltage based on the comparison, the operations 300 may further involve turning on the fourth transistor for a clock cycle of the charge pump converter.

According to certain aspects, the operations 300 further entail closing a third switch (e.g., switch S6) coupled in parallel with a third diode device (e.g., diode device 230). For certain aspects, the third diode device has a cathode coupled to the node between the first and second transistors and an anode coupled to a first power supply node (e.g., power supply node 232) of the third drive circuit. For certain aspects, a second power supply node (e.g., the CFL node) of the third drive circuit is coupled to the node between the third and fourth transistors.

Figure 4:
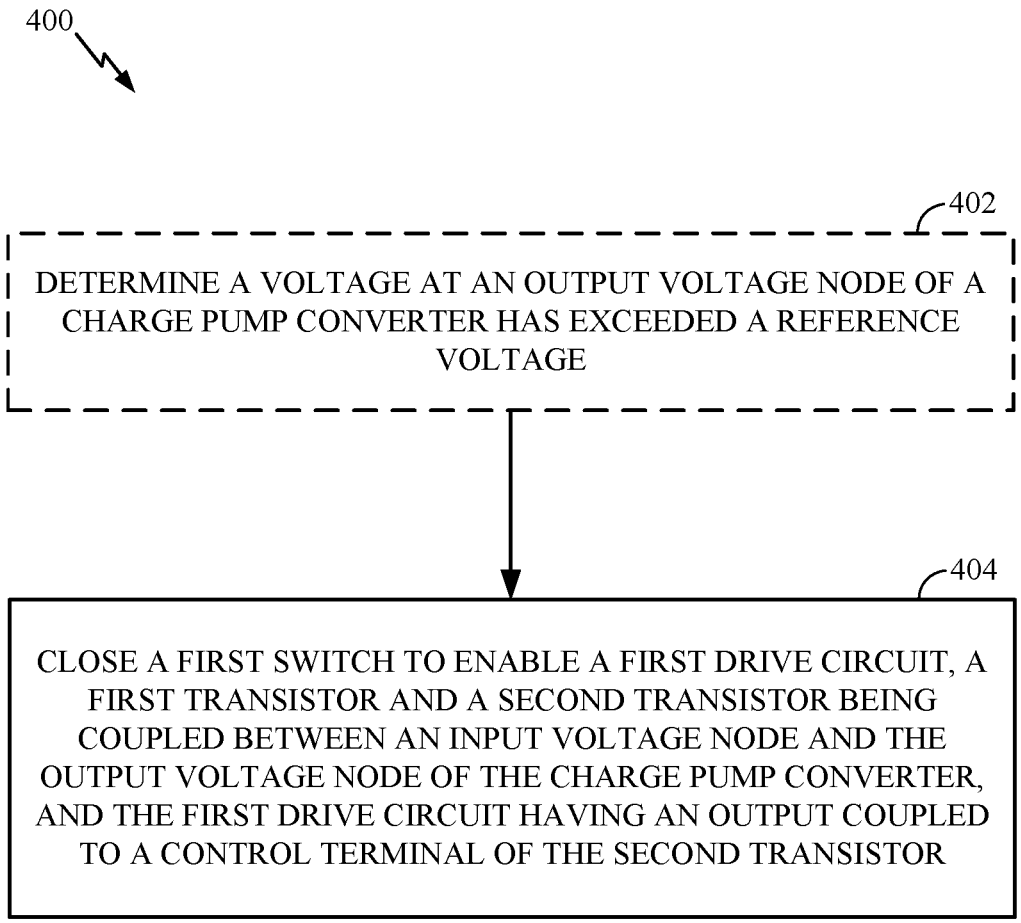

FIG. 4 is a flow diagram of example operations 400 for powering up a charge pump converter, in accordance with certain aspects of the present disclosure. The operations 400 may be performed by a charge pump converter, such as the charge pump converter 200 of FIGS. 2A-2F, and more specifically with the assistance of the protection and soft-start circuitry of the charge pump converter.

The operations 400 may begin, at block 404 by closing a first switch to enable a first drive circuit. A first transistor and a second transistor are coupled in series between an input voltage node and an output voltage node of the charge pump converter. In this case, the first drive circuit has an output coupled to a control terminal of the second transistor.

According to certain aspects, the operations 400 may begin at optional block 402 by determining that a voltage at the output voltage node has exceeded a reference voltage. In this case, closing the first switch at block 404 may be based on the determination at block 402.

According to certain aspects, the operations 400 may further involve, before closing the first switch: enabling a current source coupled between the input voltage node and the output voltage node of the charge pump converter; after enabling the current source, comparing a voltage associated with the output voltage node with a reference voltage; and after the voltage associated with the output voltage node meets or exceeds the reference voltage based on the comparison, outputting an indication for the charge pump converter, wherein the first switch is closed at block 404 based on the indication.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

For example, means for enabling a current source may include a switch coupled in series with the current source (e.g., switch S1 or switch S4 as illustrated in FIGS. 2A-2F) or a transistor (or other switch) internal to the current source. Means for comparing may include a comparator (e.g., comparator 218 as depicted in FIGS. 2A-2F) or other amplifier. Means for outputting an indication may also include a comparator. Means for driving a control terminal of a transistor may include a driver (e.g., gate drivers 202 as depicted in FIGS. 2A-2F). Means for selectively enabling means for driving may include a switch (e.g., switch S2 or switch S3 as illustrated in FIGS. 2A-2F), which may be coupled to a power supply node of the means for driving.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC with the processor, the bus interface, the user interface in the case of an access terminal), supporting circuitry, and at least a portion of the machine-readable media integrated into a single chip, or with one or more FPGAs, PLDs, controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A charge pump converter comprising:
   a first transistor and a second transistor coupled in series between an input voltage node and an output voltage node;
   a first capacitive element having a first terminal coupled to a node between the first and second transistors;
   a first switch coupled to the input voltage node, the first switch being configured to selectively enable a first drive circuit having an output coupled to a control terminal of the second transistor; and
   a first diode device having a cathode coupled to the input voltage node and an anode coupled to a first power supply node of the first drive circuit, a second power supply node of the first drive circuit being coupled to the output voltage node, wherein the first switch is coupled in parallel with the first diode device.

2. The charge pump converter of claim 1, wherein the first switch is configured to selectively enable the first drive circuit based on a voltage at the output voltage node exceeding a reference voltage.

3. The charge pump converter of claim 1, further comprising:
   a voltage divider coupled to the input voltage node;
   a comparator having a first input coupled to a tap of the voltage divider and a second input coupled to the output voltage node; and
   a selectively enabled current source coupled between the input voltage node and the output voltage node.

4. The charge pump converter of claim 3, wherein the voltage divider comprises:
   a first resistive element coupled between the input voltage node and the tap of the voltage divider; and
   a second resistive element coupled between the tap of the voltage divider and a reference potential node for the charge pump converter, the first and second resistive elements having a same resistance.

5. The charge pump converter of claim 1, further comprising a second capacitive element coupled between the output voltage node and a reference potential node for the charge pump converter.

6. The charge pump converter of claim 1, further comprising:
   a second drive circuit having an output coupled to a control terminal of the first transistor;
   a second diode device having a cathode coupled to a first power supply node of the second drive circuit and an anode coupled to at least one of the first power supply node of the first drive circuit or the anode of the first diode device; and
   a second switch coupled in parallel with the second diode device.

7. The charge pump converter of claim 6, further comprising a second capacitive element having a first terminal coupled to the node between the first and second transistors and a second terminal coupled to at least one of the cathode of the second diode device or the first power supply node of the second drive circuit.

8. The charge pump converter of claim 1, further comprising:
   a third transistor and a fourth transistor coupled in series between the output voltage node and a reference potential node for the charge pump converter; and
   a second drive circuit having an output coupled to a control terminal of the third transistor.

9. The charge pump converter of claim 8, wherein a second terminal of the first capacitive element is coupled to a node between the third and fourth transistors.

10. The charge pump converter of claim 8, further comprising:
    a diode device having a cathode coupled to the node between the first and second transistors and an anode coupled to a first power supply node of the second drive circuit, a second power supply node of the second drive circuit being coupled to a node between the third and fourth transistors; and
    a second switch coupled in parallel with the diode device.

11. The charge pump converter of claim 8, further comprising a selectively enabled current source coupled between:
    a node between the third and fourth transistors; and
    the reference potential node for the charge pump converter.

12. The charge pump converter of claim 11, further comprising a comparator having a first input coupled to a voltage reference node and a second input coupled to the node between the third and fourth transistors.

13. The charge pump converter of claim 8, wherein a gate of the third transistor is coupled to the output of the second drive circuit, wherein a drain of the third transistor is coupled to the output voltage node, and wherein a source of the third transistor is coupled to a drain of the fourth transistor.

14. The charge pump converter of claim 1, wherein a gate of the second transistor is coupled to the output of the first drive circuit, wherein a source of the second transistor is coupled to the output voltage node, and wherein a drain of the second transistor is coupled to a source of the first transistor.

15. The charge pump converter of claim 1, wherein the first drive circuit comprises a complementary metal-oxide semiconductor (CMOS) drive circuit.

16. A method of powering up a charge pump converter, the method comprising:
    enabling a current source coupled between an input voltage node and an output voltage node of the charge pump converter;
    after enabling the current source, comparing a voltage associated with the output voltage node with a reference voltage; and
    after the voltage associated with the output voltage node meets or exceeds the reference voltage based on the comparison, outputting an indication for the charge pump converter;
    closing a first switch to enable a first drive circuit based on the indication, a first transistor and a second transistor being coupled in series between the input voltage node and the output voltage node of the charge pump converter, and the first drive circuit having an output coupled to a control terminal of the second transistor.

17. The method of claim 16, further comprising determining a voltage at the output voltage node has exceeded a reference voltage, wherein closing the first switch is based on the determination.

18. The method of claim 16, wherein enabling the current source charges a capacitive element coupled between the output voltage node and a reference potential node for the charge pump converter.

19. The method of claim 16, wherein enabling the current source comprises closing a second switch coupled in series with the current source between the input voltage node and the output voltage node.

20. The method of claim 16, further comprising generating the reference voltage with a voltage divider comprising:
 a first resistive element coupled between the input voltage node and a tap of the voltage divider; and
 a second resistive element coupled between the tap of the voltage divider and a reference potential node for the charge pump converter, the first and second resistive elements having a same resistance.

21. The method of claim 16, further comprising outputting a gate drive signal from the first drive circuit to turn on the second transistor, wherein a source of the second transistor is coupled to the output voltage node and wherein a drain of the second transistor is coupled to a capacitive element.

22. The method of claim 16, wherein:
 the first switch is coupled in parallel with a first diode device;
 the first diode device has a cathode coupled to the input voltage node and an anode coupled to a first power supply node of the first drive circuit; and
 a second power supply node of the first drive circuit is coupled to the output voltage node.

23. The method of claim 22, further comprising closing a second switch coupled in parallel with a second diode device, wherein:
 a second drive circuit has an output coupled to a control terminal of the first transistor;
 the second diode device has a cathode coupled to a first power supply node of the second drive circuit and an anode coupled to at least one of the first power supply node of the first drive circuit or the anode of the first diode device; and
 a first capacitive element has a first terminal coupled to a node between the first and second transistors and a second terminal coupled to at least one of the cathode of the second diode device or the first power supply node of the second drive circuit.

24. The method of claim 23, further comprising enabling a current source coupled between a first terminal of a second capacitive element and a reference potential node for the charge pump converter, wherein:
 a second terminal of the second capacitive element is coupled to the node between the first and second transistors;
 a third transistor and a fourth transistor are coupled in series between the output voltage node and the reference potential node for the charge pump converter;
 the first terminal of the second capacitive element is coupled to a node between the third and fourth transistors; and
 a third drive circuit has an output coupled to a control terminal of the third transistor.

25. The method of claim 24, further comprising:
 after enabling the current source, comparing a voltage associated with the first terminal of the second capacitive element with a reference voltage; and
 after the voltage associated with the first terminal of the second capacitive element meets or exceeds the reference voltage based on the comparison, turning on the fourth transistor for a clock cycle of the charge pump converter.

26. The method of claim 25, further comprising closing a third switch coupled in parallel with a third diode device, wherein:
 the third diode device has a cathode coupled to the node between the first and second transistors and an anode coupled to a first power supply node of the third drive circuit; and
 a second power supply node of the third drive circuit is coupled to the node between the third and fourth transistors.

* * * * *